Nov. 15, 1960     F. M. M. B. SALOMON     2,959,971
TRANSMISSION DEVICE
Filed May 12, 1958                                              4 Sheets-Sheet 1
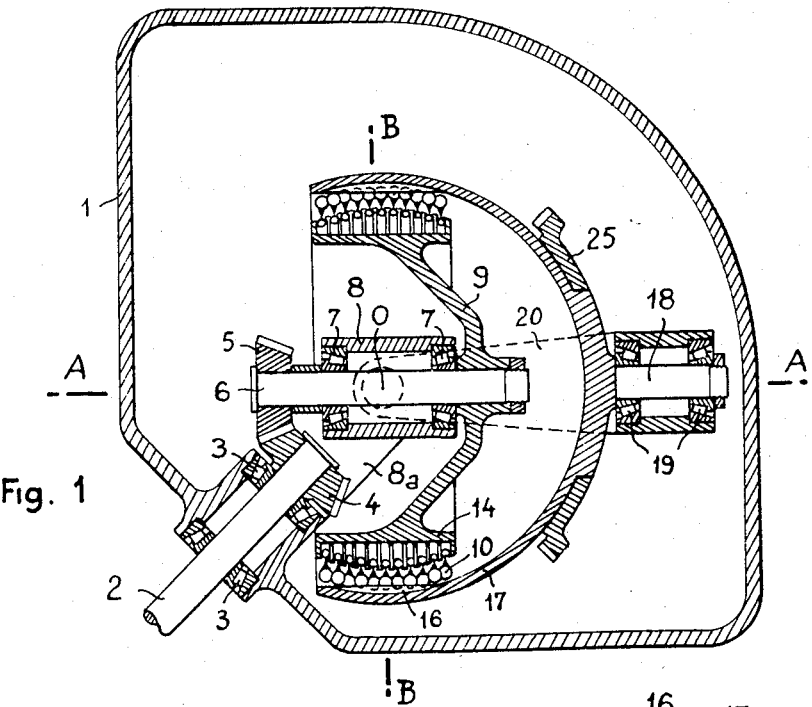
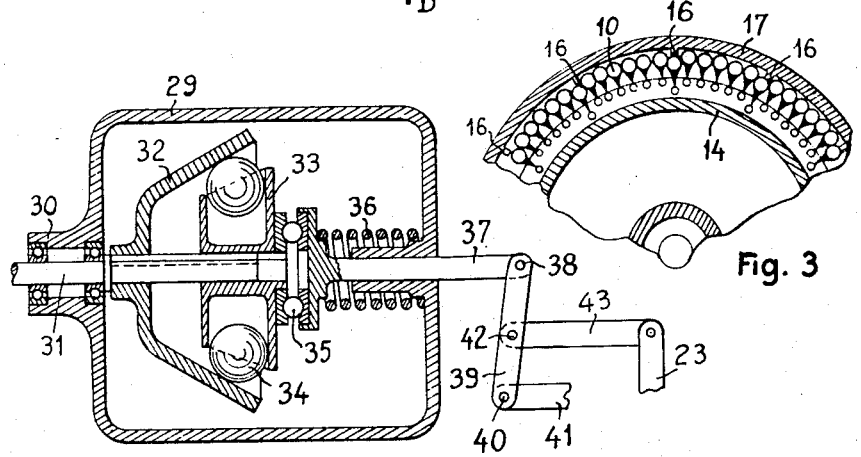

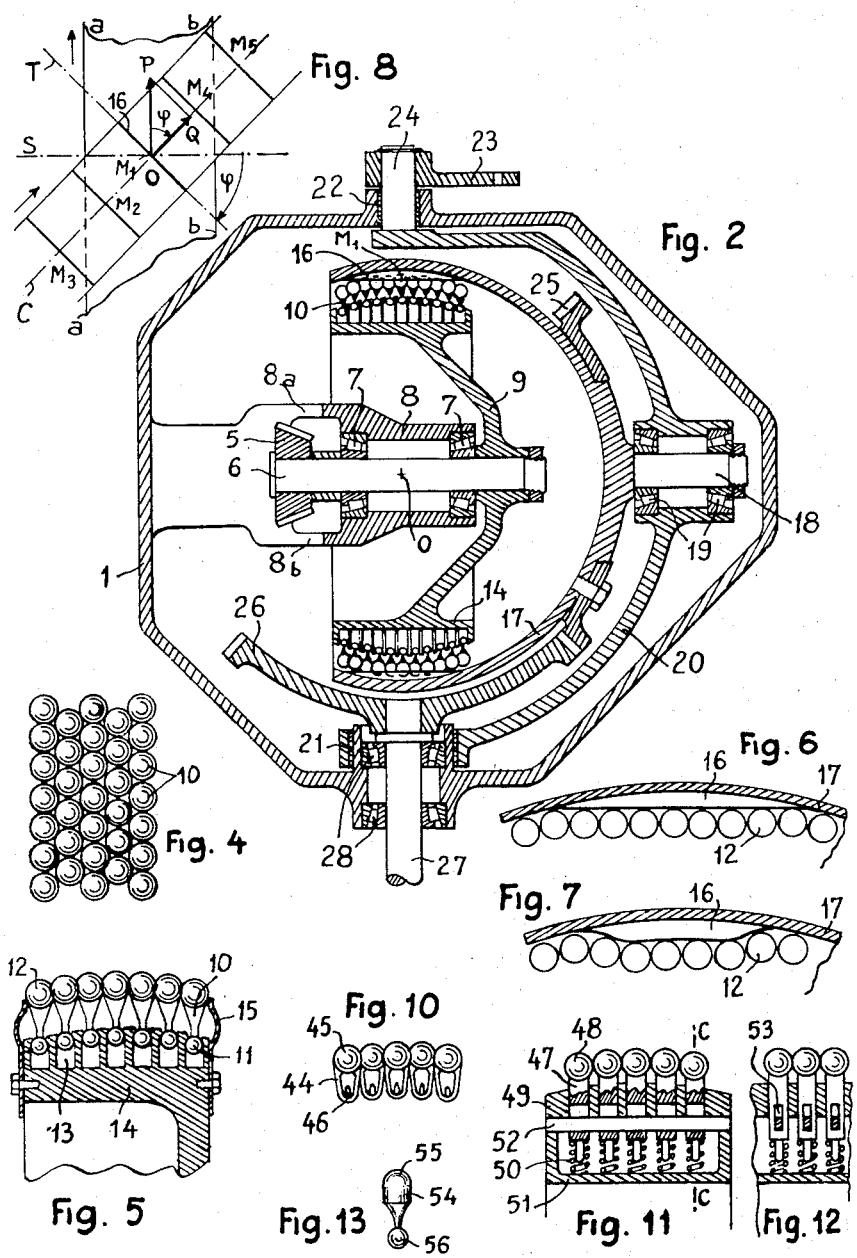

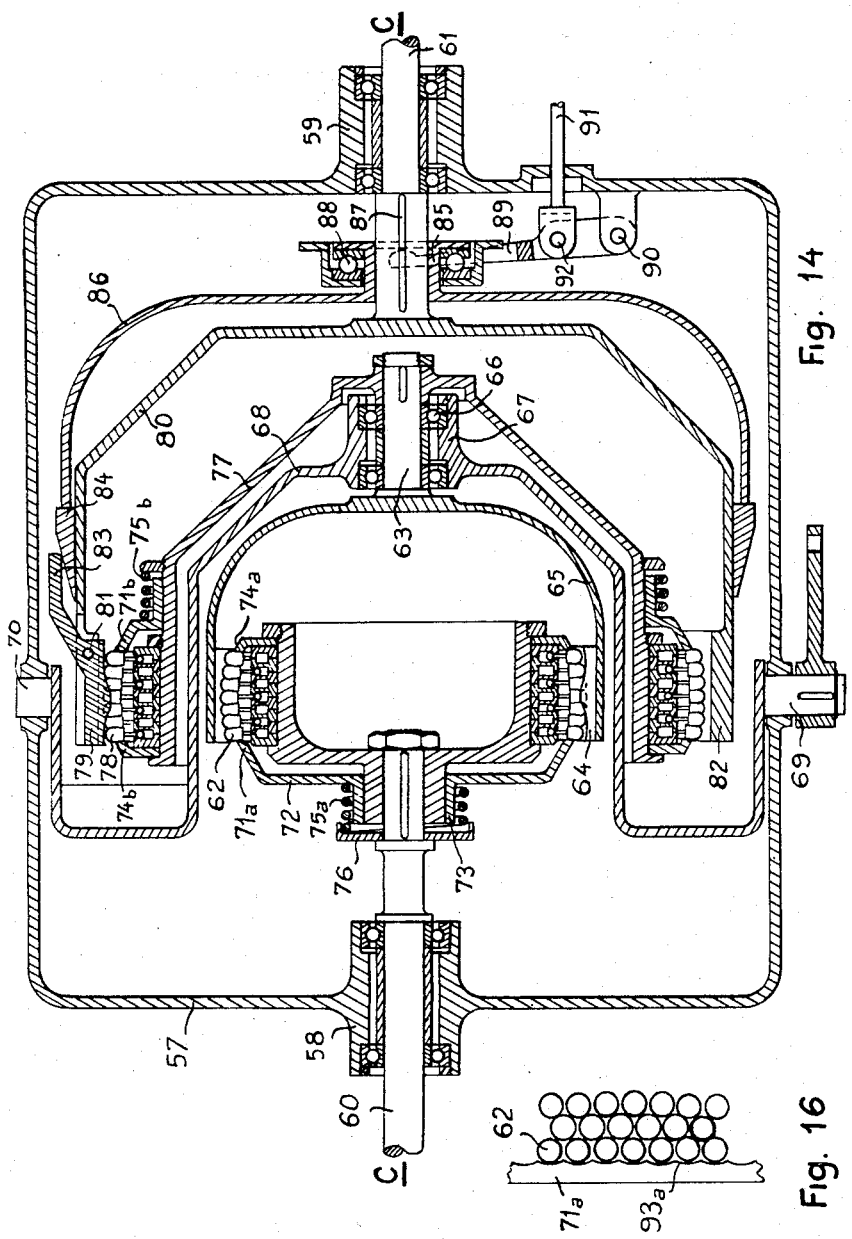

2,959,971

TRANSMISSION DEVICE

François Marie Michel Bernard Salomon,
11 Rue de l'Universite, Paris, France

Filed May 12, 1958, Ser. No. 734,635

Claims priority, application France May 16, 1957

10 Claims. (Cl. 74—198)

The present invention has for its object to improve the device which forms the subject of the U.S. Patent No. 2,826,285 for "Transmission System Adapted to Form a Torque Converter."

This improvement has especially for its object to produce a transmission device which is simpler and has a better efficiency than that which forms the subject of the patent refrered to above.

The invention employs a series E of solid elements P, each of which is in general of small dimensions, and the series E of elements P is driven by the rotation of a first rotating shaft. This shaft, which will hereinafter be termed the "primary shaft" is in certain cases the driving shaft itself. In other cases, it may be driven in rotation by the driving shaft.

For this reason, the elements P of the unit E are subjected to the action of centrifugal forces generated by this rotation.

The elements P are preferably substantially adjoining to each other and thus form what is hereinafter known as a "net." The surface of the net constituted by the elements P is a surface of revolution about the axis of the rotating shaft and, more specially, is a spherical surface.

A second shaft known as the "secondary shaft"—which is in general the driven shaft—carries protuberances capable of penetrating into the net without shocks or very substantially without shocks, and it is by the action of the elements P of the net on these protuberances that the drive of the second shaft (secondary shaft) is effected by the first (primary shaft) under the conditions which will be explained later.

In the forms of embodiment described below, the protuberances are in the form of flat blades carried by the secondary shaft, the planes of which are parallel to the axis of this secondary shaft, and the surface of the net is substantially spherical; in addition, in these forms of embodiment, the geometrical axes of the primary and secondary shafts are concurrent and form an angle $\varphi$.

The applicant has found that under these conditions, if U is the angular speed of the primary shaft and V is the angular speed of the secondary shaft, we have substantially:

$V = U \cos \varphi$ (as will be explained later) for any value of $\varphi$

From which $$\frac{V}{U} = \cos \varphi$$

This fact will be referred to in more detail later.

If the angle $\varphi$ is caused to vary progressively, there is produced a progressive variation of the ratio of the angular speeds $$\frac{N}{U}$$

There is thus obtained a "progressive" (or "continuous") torque converter which may, when so desired, be automatic, as will be seen later.

The elements P of the net may particularly be small centrifuged needles or small centrifugal pendulums which are returned to their mean position by the centrifugal forces developed by the rotation of the primary shaft which drives the net.

The accompanying drawings, which have been given by way of example, are especially intended to facilitate a better understanding of the invention. They are not in any way limitative.

Fig. 1 is a longitudinal section of a form of application of the invention to a torque converter.

Fig. 2 is a cross-section of the same device through the plane AA.

Fig. 3 is a partial cross-section of this device along the plane BB.

Fig. 4 is a partial view of the surface of a net.

Fig. 5 is a partial cross-section to an enlarged scale of a particular form of the net.

Figs. 6 and 7 show particular forms of blades.

Fig. 8 is an explanatory diagram.

Fig. 9 is a longitudinal cross-section of an automatic driving device.

Fig. 10 shows a further form of net.

Figs. 11 and 12 are partial cross-sections relating to a net formed by push-rods.

Fig. 13 shows a particular form of the elements P of a net, which are in this case small centrifugal pendulums.

Figure 15:
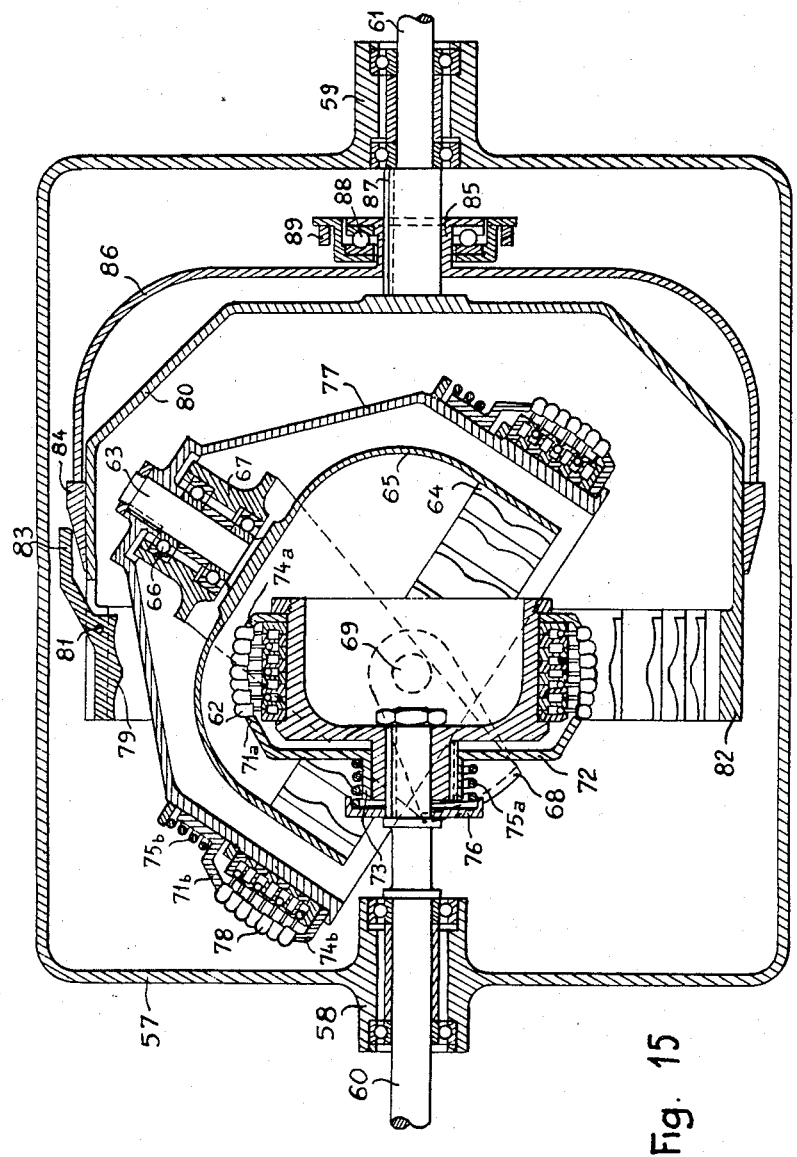

Figs. 14 and 15 relate to a torque converter in accordance with the invention, in which the driving and receiving shafts are in line and which does not comprise gears.

Fig. 16 shows in detail a lateral portion of the net employed in this converter.

In Figs. 1 and 2, a fixed casing 1 carries the apparatus. The driving shaft 2 passes in the bearings 3 carried by the fixed casing 1.

The pinion 4 (Fig. 1) rigidly fixed to the shaft 2, engages with the pinion 5 fixed to the shaft 6 which passes into the bearings 7.

The bearings 7 are carried by a tube 8 coupled to the frame of the device by arms 8a and 8b (Figs. 1 and 2).

The shaft 6 drives in its rotation a web 9 which carries the member which has been termed "net."

In the form of embodiment shown, the net is constituted as follows: It comprises a large number of small centrifugal pendulums 10 arranged in quincuncial relation (Fig. 4) and touching each other.

The centrifugal pendulums 10 which can be seen in Figs. 1, 2, 3, 4 and 5 are shown in detail in Fig. 5. Each pendulum comprises (Fig. 5) a foot 11 in the form of a sphere, a body 10 and a head 12 which also has the form of a sphere.

The feet 11 are engaged in grooves 13 formed in a rim 14 (Figs. 1, 2, 3 and 5) and located in planes perpendicular to the geometric axis of the intermediate shaft 6. Each groove 13 is of such a form that it permits the pendulums, the feet of which it receives, to take up freely any inclination in the plane of this groove and also to incline through a certain angle to the right and to the left with respect to this groove.

The depth of the grooves is such that the pendulums may sink down by a certain amount.

The pendulums 10 are subjected to the centrifugal force developed by the rotation of the shaft 6, which forms a restoring force, urging them into a position most remote from the shaft 6.

Their heads 12 are each in contact with those of the adjacent pendulums (Figs. 1, 2, 3, 4 and 5) and are externally tangential to a fictitious sphere having its centre at O (Figs. 1 and 2) located on the geometric axis of the shaft 6. (The point O thus constitutes the "centre" of the device.)

On the sides of the net constituted by the centrifugal pendulums 10 are located lateral strips 15 (Fig. 5) substantially perpendicular to the geometric axis of the shaft 6, and which apply side pressure on the spheres 12 which are in contact with them and, through their intermediary, from one sphere to the other over the entire net. (These strips may be elastic.)

Figs. 1, 2 and 3 show that blades 16 penetrate into the net constituted by the pendulums 10.

The blades 16 are carried by a cap 17 which is rigidly fixed to a shaft 18, the geometric axis of which can vary in orientation, as will be seen later, but which passes always through the point O "the centre of the device."

The shaft 18 is carried by the bearings 19 (Figs. 1 and 2) which are themselves mounted on the stirrup 20 (see Fig. 2).

This stirrup is centered on the bearings 21 and 22 carried by the fixed casing 1 (Fig. 2). These bearings have a common geometric axis which also passes through the centre O which is the centre of the device (Fig. 2).

For the particular position shown in Figs. 1 and 2, the geometric axes of the shafts 6 and 18 are coincident; the stirrup 20 can however rotate about the geometric axis of the bearings 21 and 22 by any particular angle which will be designated by $\varphi$.

In order to effect this rotation through $\varphi$, it is only necessary to act on the handle 23 (Fig. 2) which is keyed on the trunnion 24 rigidly fixed to the stirrup 20.

The angle $\varphi$ made by the axis of the shaft 18 with the axis of the shaft 6 can thus be varied at will. (For the position shown in Figs. 1 and 2, this angle $\varphi$ is zero.)

The cap 17 carries a toothed wheel 25 (Figs. 1 and 2) which engages with the toothed wheel 26 fixed on the receiving shaft 27, which passes in bearings 28 carried by the fixed casing 1 (Fig. 2). The geometric axis of the receiving shaft 27 coincides with the geometric axis of the bearings 21 and 22 (Fig. 2).

Figs. 6 and 7 show, by way of example, forms of the blades 16, these forms having the object of facilitating the shockless penetration of the blades 16 into the net constituted by the heads 12 of the centrifugal pendulums.

The operation takes place as follows:

The driving shaft 2 (Fig. 1) drives the shaft 6, which is the shaft described as the primary shaft at the beginning of the present description, by means of the pinions 4 and 5. Under the action of centrifugal force, the centrifugal pendulums 10 arrange themselves perpendicularly to the axis of the shaft 6 and form a spherical net having its centre at O (Figs. 1 and 2).

At a sufficient angular speed U of the shaft 6, the net of centrifugal pendulums applies to the blades 16 of the shaft 18, known as the secondary shaft, efforts which are sufficient to drive this shaft under good conditions.

In the case of Figs. 1 and 2, the shaft 18 is in line with the shaft 6.

We have therefore:

$$\varphi=0, \cos \varphi=1, \frac{V}{U}=1$$

The shaft 18 then acquires an angular speed equal or substantially equal to that of the shaft 6.

It transmits its motion to the receiving shaft 27 through the medium of the toothed wheels 25 and 26 (Fig. 2).

If now the operator wishes to cause the receiving shaft 27 to rotate less quickly than before with the same speed of the shaft 6 (and in consequence, for the same speed of the driving shaft 2), he acts on the handle 23 (Fig. 2) and by this means he rotates the stirrup 20 through a certain angle $\varphi$ about the geometric axis of the bearings 21—22, which axis passes through the centre O of the device.

The relation between the angular speed U of the shaft 6 which carries the net and the angular speed V of the shaft which carries the blades 16 is substantially: $V=U \cos \varphi$, as will be seen later.

Fig. 8 is an explanatory diagram on this point.

OS is the projection of the axis of the shaft 6, which carries the net, on the plane of Fig. 1.

OT is the projection on the plane of Fig. 1 of the axis of the shaft 18 which carries the blades.

These axes are concurrent at the point O, the centre of the device, and form between them an angle $\varphi$.

There has been shown at 16 the projection, on the plane of the axes OS and OT of the blade which is located at a given instant in the plane determined by the axis of the shaft 18 and the geometric axis of the bearings 21 and 22 (this blade is parallel to the axis 18).

$M_1$ is the point of the net which is located at this given instant on the geometric axis of the bearings 21—22 and in contact with the blade 16.

In Fig. 8, this point $M_1$ is projected at O.

Fig. 8 shows diagrammatically, between the lines $aa$ and $bb$ the development of the spherical surface of the net in the vicinity of the point $M_1$, and shows also diagrammatically the development of the surface which carries the blades.

These blades are shown, at the instant considered, at the points $M_1$, $M_2$, $M_3$, $M_4$, $M_5$, etc.

If the linear speed of the element of the net which is located at $M_1$ is considered, at the instant in question, its linear speed is equal to $R \times U$ where R is the radius $OM_1$.

This linear speed $R \times U$ is shown in Fig. 8 by the vector $\overline{M_1P}$, with $\overline{M_1P}=R \times U$.

The vector $\overline{M_1P}$ is decomposed into two vectors $\overline{M_1Q}$ and $\overline{QP}$.

The vector $\overline{M_1Q}$ is perpendicular to the blade 16 and, in consequence, perpendicular to the axis OT of the shaft 18 which carries the blades, since the planes of the blades 16 are in this case parallel to the axis OT.

The vector $\overline{QP}$ is parallel to the blade 16, and we have vectorially: $\overline{M_1P}=\overline{M_1Q}+\overline{QP}$.

On the other hand, $\varphi$ being as previously, the angle of the axis OT of the shaft 18 with the axis OS of the shaft 6, we have: $\overline{M_1Q}=\overline{M_1P} \cos \varphi$.

Now, the vector $\overline{M_1Q}$ represents the linear driving speed due to the rotation of the shaft 18 the axis of which is OT (that is to say the linear speed of the point of the blade 16 which coincides at that instant with the element of the net considered).

This linear speed is equal to $R \times V$, V being the angular speed of the shaft 18.

We have therefore:

$$RV=RU \cos \varphi$$

$$V=U \cos \varphi$$

and $$\frac{V}{U}=\cos \varphi$$

This reasoning obviously applies only to the blade which is located at the point $M_1$ at the instant considered.

If, at the same instant, there are considered the points $M_2$, $M_3$, $M_4$, $M_5$, etc. calculation proves that the law is the same as for the point $M_1$, namely: $V=U \cos \varphi$.

If we now consider the pendulum heads—or more generally (in the case in which the system is not constituted by pendulums), if we consider the elements of the net—which are not on the central line C (Fig. 8), but which are slightly distant from it, the law is again substantially $V=U \cos \varphi$, as shown by calculation.

In the final result, the ratio $$\frac{V}{U}=\cos \varphi$$

varies in a continuous manner with the angle $\varphi$.

It is thus only necessary to vary gradually the angle $\varphi$ in order to vary gradually the ratio $$\frac{V}{U}$$

The device therefore constitutes a progressive or continuous torque converter.

In the case of Figs. 1 and 2, the angle $\varphi$ may vary substantially from 0 to $$\frac{\pi}{2}$$

In other cases, it could be varied by more than $$\frac{\pi}{2}$$

and thereby obtain a change in the sense of operation (or "reverse operation").

During working, if the angle $\varphi$ is not equal to $$\frac{\pi}{2}$$

the blades are driven by the net (vector $\overline{M_1Q}$ of Fig. 8).

At the same time however, there is a relative movement of the blades across the system (vector $\overline{QP}$ of Fig. 8) when the angle $\varphi$ is not zero.

This relative movement of the blades in the net should take place with the greatest possible smoothness.

To this end, the blades have an appropriate shape so that the elements of the net (the pendulums 10 in the case of Figs. 1, 2, 3 and 5) can move down substantially without shocks in order to allow the blades to pass. (These elements of the net are engaged by the edges of the blades.)

Figs. 6 and 7 show by way of example and without limitation, forms of blades on an enlarged scale, which comprise rounded portions intended to prevent shocks at the moment of contact of the blades with the elements of the net.

In Fig. 6, the blade comprises a straight chord with rounded portions to the right and to the left.

In Fig. 7, the blade is provided with a greater number of rounded portions.

In order to reduce friction, there is generally an advantage in centrifuging oil which is constantly applied to the blades 16, under pressure when so required.

The device for varying the angle $\varphi$ (the handle 23 in Fig. 2) may be under the control of the driver or of an automatic control member.

It may be under the control of an automatic device with a view to obtaining a pre-determined condition (for example an approximately constant speed of the motor under pre-determined conditions).

It may be simultaneously operated at the will of the driver (with or without servo-control) and under the control of an automatic device.

Fig. 9 is a longitudinal cross-section of an arrangement relative to this case. A casing 29 carries in a bearing 30 a shaft 31 which is rigidly fixed to a bell 32.

A cage 33, which can slide on the shaft 31, rotates with this shaft and drives the balls 34 which are forced against the bell 32 by centrifugal force and thrust back an abutment 35 against the action of a calibrated spring 36.

The shaft 31 is driven by one of the shafts of the device, for example the driving shaft.

The abutment 35 acts on the rod 37 which is articulated at 38 to a bar 39 of a rocking-lever. On this rocking-lever is pivoted at 40 a bar 41 which is controlled by the operator.

At 42 is articulated a bar 43 which is operatively connected to the handle 23 of Fig. 2, and thereby controls the variations of the angle $\varphi$, and in consequence the variations of the ratio of the angular speeds (gradually, furthermore).

In many applications (especially in the case of vehicles) an automatic mechanism can be produced which makes use of the action of the following factors: (1) The opposing torque (by reaction of the teeth of the wheel 26 on the teeth of the wheel 25 in Fig. 2). (2) The speed of the driving shaft, actuating a regulator similar to that of Fig. 9, or of any other type. (3) A calibrated spring, of which the spring 36 of Fig. 9 gives an example without limitation.

A device can be employed, of which that of Fig. 9 gives an example without limitation, while eliminating or not the action of the driver.

Arrangements of this kind will often be advantageous for the automatic control of vehicles.

On the other hand, and in a general way, it is necessary to indicate the advantage which can often be obtained by using a spring (the spring 36 of Fig. 9, or any other elastic device) in order to bring the device automatically back to the neutral position by fulfilling the condition:

$$\phi = \frac{\pi}{2}$$

$\cos \varphi = 0$ (which gives the neutral position), when the speed of the shaft 6 falls below a certain value.

The invention is capable of taking numerous alternative forms. These alternative forms may concern the various elements of the device.

In particular, they may be directed to the constitution of the net. The net may be constituted by elements of the most varied forms, with or without pendulums.

Fig. 10 shows a form using centrifugal pendulums, in which each pendulum is in the form of a ring 44 having a spherical head 45. The rings are retained by wires 46 of appropriate section (circular or ovoid or other) carried by the rim 14 rigidly fixed to the shaft 6 (Figs. 1 and 2).

Fig. 11 and Fig. 12 (which is a section along the line C—C of Fig. 11) relate to the case in which, instead of being pendulums, the elements of the net are push-rods 47 carrying spherical heads 48. These push-rods are guided by the rim 49. They are acted upon by springs 50 which are supported on a rim 51. They are retained by rods 52 which pass through the cavities 53 formed in the rods of the pushing bodies.

In this alternative form, the centrifugal force developed by rotation of the shaft 6 co-operates—more or less, depending on the cases of application—with the springs 50.

Fig. 13 shows a particular form of centrifugal pendulum adapted to play the part of an element of the net. The head of this pendulum comprises a cylindrical portion 54 terminating in a hemisphere 55; the foot is constituted by a sphere 56.

There will now be described an alternative form of the invention in which the driving and receiving shafts are in line, and in which it is however possible to avoid the use of any gearing.

In Figs. 14 and 15, a casing 57 carries the bearings 58 and 59 for the driving shaft 60 and the receiving shaft 61, which are located one in the line of extension of the other.

The driving shaft 60 carries a net of centrifugal pendulums 62 similar to the net of pendulums 10 of Figs. 1, 2, 3, 4 and 5.

An intermediate shaft 63 carries blades 64 similar to the blades 16 of the previous figures, fixed on a rotating casing 65.

These blades penetrate into the net of centrifugal pendulums 62.

The intermediate shaft 63 is carried by bearings 66, which are themselves housed in a tube 67.

The tube 67 is in turn supported by a stirrup 68. The stirrup 68 is provided with pivots 69 and 70, by virtue of which the stirrup can turn through a certain angle with respect to the casing 57.

In the position shown in Fig. 14, the driving shaft 60, the intermediate shaft 63 and the receiving shaft 61 have their geometric axes in line.

With respect to this position, the stirrup 68 can pivot about its pivots 69 and 70 through an angle which will be designated by $\varphi$, as before.

The net constituted by the centrifugal pendulums 62 differs from the net formed by the centrifugal pendulums 10 of Figs. 1, 2, 3, 4 and 5 in certain particular respects, which will now be described.

The border 71a of the net is carried by an end-plate 72 rigidly fixed to a sleeve 73 which can slide slightly parallel to the shaft 60.

On the other hand, the border 74a of the net is fixed.

A spring 75a is supported on a seat 76 which is rigidly coupled to the driving shaft 60.

Under these conditions, a certain elastic pressure is applied laterally to the net of centrifugal pendulums.

The intermediate shaft 63 is rigidly fixed to a cap 77 which carries a second net of centrifugal pendulums 78.

This net is similar to the other nets already described. The border 71b pushed by the spring 75b acts elastically on the side of this net in conditions similar to those which have been explained with reference to the border 71a pushed by the spring 75a.

The blades 79 penetrate into this net.

The blades 79 are carried by a rotating casing 80 which is itself rigidly fixed to the receiving shaft 61.

The blades 79 are similar to the blades already described (16 and 64). They have however a special feature which will be explained: these blades are movable with respect to the casing 80. They can be lifted slightly by a device which will be described, and which enables the depth of their penetration into the net of pendulums 78 to be modified.

This device consists in this: each blade 79 is pivotally-mounted on a pin 81 carried by the rim 82 of the rotating casing 80.

In addition, each blade 79 terminates in a tail 83.

This tail 83 is applied under the action of centrifugal force against a rim 84, the section of which is of bevelled form and which is coupled to a hub 85 by means of the arms 86.

By means of a key 87, the hub 85 is fast for rotation with the shaft 61, but can slide parallel to this shaft 61.

This sliding action can be controlled by the thrust bearing 88 and the fork 89 pivoted at 90.

This fork can itself be operated by the rod 91 which is pivoted on the fork member at 92.

By virtue of this device, it is possible to lift the blades, even during the operation of the transmission, by acting on the rod 91 and the fork 89.

By pulling on the rod 91 towards the right hand side of the figure, the blades 79 lift automatically due to the action of centrifugal force. The depth of their penetration into the net of centrifugal pendulums 78 can be varied by regulating the position of the fork 89.

Fig. 16 shows a detail of the border 71a (the borders 71b, 74a, 74b are similar). It can be seen from Fig. 16 that each border is provided with fraised rounded portions 93a, in which are housed the heads of the centrifugal pendulums 62. The radius of each rounded portion 93a is slightly greater than the radius of the heads of the pendulums.

Fig. 15 shows the same device as Fig. 14 but is however a cross-section through the plane C—C of Fig. 14. In addition, in Fig. 15, the intermediate shaft 63 is not in the extension of the driving shaft 60 and the receiving shaft 61. It makes with these shafts the angle which has been designated by $\varphi$ previously. (On the other hand, as has been stated above, in Fig. 14 this intermediate shaft 63 is in the line of extension of the driving and receiving shafts 60 and 61.)

The operation takes place as follows:

The drive of the intermediate shaft 63 by the driving shaft 60 is effected as has been explained with reference to the devices of Figs. 1 and 2, by virtue of the action of the centrifugal pendulums 62 on the blades 64.

If W is the angular speed of the intermediate shaft 63, and U is, as before, the angular speed of the driving shaft 60, we then have:

$$W = U \cos \varphi \qquad (1)$$

($\varphi$ being the angle between the shaft 63 and the shaft 60).

The intermediate shaft 63 then drives the receiving shaft 61 by means of the action of the centrifugal pendulums 78 on the blades 79, and we again have:

$$V = W \cos \qquad (2)$$

(V being, as before, the angular speed of the receiving shaft).

From the equations 1 and 2, we deduce:

$$V = U \cos^2 \varphi \text{ or } \frac{V}{U} = \cos^2 \varphi$$

If therefore the angle $\varphi$ is caused to vary progressively, there is again actually obtained a transmission with a gradual ratio of speed.

The advantage of the device of Figs. 14 and 15 is that the receiving shaft is in the line of extension of the driving shaft and that no gears are employed.

It will be noted that when $\varphi=0$, $\cos \varphi=1$, there is obtained a direct drive with the entire device driven as a unit.

What I claim is:

1. A transmission system adapted to form a torque converter including a rotary primary shaft, a stationary casing, bearings carried by the stationary casing and revolubly carrying the primary rotary shaft, a rotary member rigid with said primary rotary shaft, a plurality of small centrifugal elements suspended from said rotary member subjected to centrifugal action through the rotation of said rotary member and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the small centrifugal elements, at least one receiver shaft revolubly carried by the stationary casing and the direction of the axis of which is unvarying, means for transmitting the rotation of the secondary shaft to the receiver shaft and means for modifying the said angle $\varphi$.

2. A transmission system adapted to form a torque converter including a rotary primary shaft, a stationary casing, bearings carried by the stationary casing and revolubly carrying the primary rotary shaft, a rotary member rigid with said primary rotary shaft, a plurality of small centrifugal elements suspended from said rotary member subjected to centrifugal action through the rotation of said rotary member and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the small centrifugal elements, the angular speed of the secondary shaft being substantially equal to the angular speed of the primary shaft multiplied by $\cos \varphi$, at least one receiver shaft revolubly carried by the stationary casing and the direction of the axis of which is unvarying, means for transmitting the rotation of the secondary shaft to the receiver shaft and means for modifying the said angle $\varphi$.

3. A transmission system adapted to form a torque converter including a rotary primary shaft, a stationary casing, bearings carried by the stationary casing and revolubly carrying the primary rotary shaft, a rotary member rigid with said primary rotary shaft, other bearings carried by the stationary casing and revolubly carrying a rotary driving shaft the geometrical axis of which makes a certain constant angle with the geometrical axis of the primary shaft, means for transmitting the rotation of the rotary driving shaft to the primary shaft, a plurality of small centrifugal elements suspended from said rotary member subjected to centrifugal action through the rotation of said rotary member and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the small centrifugal elements, at least one receiver shaft revolubly carried by the stationary casing and the direction of the axis of which is unvarying, means for transmitting the rotation of the secondary shaft to the receiver shaft, and means for modifying the said angle $\varphi$.

4. A transmission system adapted to form a torque converter including a rotary primary shaft, a stationary casing, bearings carried by the stationary casing and revolubly carrying the primary rotary shaft, a rotary member rigid with said primary rotary shaft, a plurality of small centrifugal elements suspended from said rotary member subjected to centrifugal action through the rotation of said rotary member and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the small centrifugal elements, at least one receiver shaft revolubly carried by the stationary casing and the direction of the axis of which is unvarying, means for transmitting the rotation of the secondary shaft to the receiver shaft, a first lever connected to said movable stirrup, a first bar connected to said first lever, a second lever connected to said first bar, a second bar adapted to be controlled by the operator and adapted to act on said second lever, a rotary shaft in rotational relationship with said system and means subject to the centrifugal action produced by said rotary shaft and adapted to act on said second lever jointly with the action of the operator for modifying said angle $\varphi$.

5. A transmission system adapted to form a torque converter including a rotary primary shaft, a stationary casing, bearings carried by the stationary casing and revolubly carrying the primary rotary shaft, a first rotary member rigid with said primary rotary shaft, a first plurality of small centrifugal elements suspended from said first rotary member subjected to centrifugal action through the rotation of said first rotary member, and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the first plurality of small centrifugal elements, a second rotary member rigid with said secondary shaft, a second plurality of small centrifugal elements suspended from said second rotary member, subjected to centrifugal action through the rotation of said second rotary member and forming a net the external surface of which is substantially a portion of sphere, at least one receiver shaft revolubly carried by the stationary casing and the direction of the axis of which is unvarying, other driven blades carried by the receiver shaft and which engage with the second plurality of small centrifugal elements, and means for modifying the said angle $\varphi$.

6. A transmission system adapted to form a torque converter including a rotary primary shaft, a stationary casing, bearings carried by the stationary casing and revolubly carrying the primary rotary shaft, a first rotary member rigid with said primary rotary shaft, a first plurality of small centrifugal elements suspended from said first rotary member subjected to centrifugal action through the rotation of said first rotary member and forming a net the external surface of which is substantially a portion of a sphere, a movable stirrup rotatably supported by the stationary casing, a pair of coaxial bearings carried by said movable stirrup and assuming a variable slope at an angle $\varphi$ with the geometrical axis of the primary shaft, a secondary shaft revolubly carried by said pair of coaxial bearings, driven blades carried by the secondary shaft and which engage with the first plurality of small centrifugal elements, a second rotary member rigid with said secondary shaft, a second plurality of small centrifugal elements suspended from said second rotary member, subjected to centrifugal action through the rotation of said second rotary member and forming a net the external surface of which is substantially a portion of a sphere, at least one receiver shaft revolubly carried by the stationary casing and the direction of the axis of which is unvarying, a rotary web rigid with the receiver shaft, other driven blades pivotally mounted on said rotary web, means for turning said other driven blades in reference to said rotary web and for engaging them at an adjustable depth with the second plurality of small elements and means for modifying said angle $\varphi$.

7. A transmission system as claimed in claim 6, in which the geometrical axis of the receiver shaft is in alignment with the geometrical axis of the primary shaft.

8. A transmission system as claimed in claim 1, in which the small centrifugal elements are pendulums having small dimensions and slight masses, the parts of said pendulums which engage with the driven blades carried by the secondary shaft having substantially the form of portions of spheres.

9. A transmission system as claimed in claim 1, in which the small centrifugal elements are cylindrical pushing bodies, having small dimensions and slight masses, the parts of said cylindrical pushing bodies which engage with the driven blades carried by the secondary shaft, having substantially the form of portions of spheres.

10. A transmission system as claimed in claim 1, in which the small centrifugal elements are quincuncially disposed and in mutual contact.

References Cited in the file of this patent

UNITED STATES PATENTS

| | | |
|---|---|---|
| 1,851,146 | Banker | Mar. 29, 1932 |
| 2,230,627 | Sachse | Feb. 4, 1941 |
| 2,826,285 | Salomon | Mar. 11, 1958 |

FOREIGN PATENTS

| | | |
|---|---|---|
| 438,750 | Italy | Aug. 27, 1949 |